(12) United States Patent
Hanyu

(10) Patent No.: US 6,702,368 B1
(45) Date of Patent: Mar. 9, 2004

(54) PILLAR STRUCTURE OF A VEHICLE

(75) Inventor: Atsushi Hanyu, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/337,337

(22) Filed: Jan. 7, 2003

(30) Foreign Application Priority Data

Jan. 16, 2002 (JP) .................................. P2002-007758

(51) Int. Cl.$^7$ .............................................. B62D 25/04
(52) U.S. Cl. ........................ 296/193.06; 296/193.05; 296/203.01; 296/203.03; 296/205
(58) Field of Search .................... 296/193.05, 193.06, 296/187.01, 187.12, 203.01, 203.03, 202, 205; 52/731.6, 731.8, 735.1

(56) References Cited

U.S. PATENT DOCUMENTS

| | | | | |
|---|---|---|---|---|
| 5,938,275 | A | * | 8/1999 | Kleinhans et al. ...... 296/203.03 |
| 6,279,990 | B1 | * | 8/2001 | Miyasaka et al. ....... 296/203.03 |
| 6,419,302 | B2 | * | 7/2002 | Mikuni ................... 296/203.03 |
| 6,478,367 | B2 | * | 11/2002 | Ishikawa ............... 296/203.03 |
| 6,485,089 | B2 | * | 11/2002 | Hanyu ................... 296/203.01 |
| 6,607,239 | B1 | * | 8/2003 | Fuji ....................... 296/203.03 |
| 6,619,727 | B1 | * | 9/2003 | Barz et al. ............. 296/203.02 |

FOREIGN PATENT DOCUMENTS

| | | |
|---|---|---|
| EP | 1 040 984 A2 | 10/2000 |
| EP | 1 138 581 A2 | 10/2001 |
| JP | 2001-122155 | 5/2001 |

* cited by examiner

Primary Examiner—D. Glenn Dayoan
Assistant Examiner—Greg Blankenship
(74) Attorney, Agent, or Firm—McDermott, Will & Emery

(57) ABSTRACT

A pillar structure which includes a pillar member connected to an upper potion and a lower portion of a transversely outer vehicle body. The pillar member is formed into a channel open toward a compartment, with a transversely outer base wall, and a pair of side walls which are thinner than the base wall and extend from both front and rear sides of the base wall. Each side wall is formed to have a first tapered portion gradually reducing in thickness from a base end portion of the side wall to a substantially center portion of the width thereof. Stiffening projections are formed on an inner surface of each side wall at predetermined intervals in a pillar longitudinal direction, and extend from a distal end portion of the side wall to the base end portion thereof.

7 Claims, 14 Drawing Sheets

PILLAR STRUCTURE OF A VEHICLE

BACKGROUND OF THE INVENTION

1. Field of the Invention

The present invention relates to a pillar structure of a vehicle, including a pillar member having a cross section open toward an inside of a compartment.

2. Description of the Related Art

A center pillar of an automobile is connected to a roof side member in an upper portion of a transversely outer vehicle body and a side sill in a lower portion of the vehicle body so as to stride over the vehicle body. On the center pillar, a door hinge of a rear door, a shoulder adjuster of a seat belt, and the like are attached. Accordingly, the center pillar generally has a structure with a closed cross section for strength required to support them.

The Japanese Patent application Laid-Open No. 2001-122155 discloses a pillar structure, in which the pillar member is formed into a structure with an open cross section by casting of a lightweight alloy such as aluminum for reducing weight thereof.

SUMMARY OF THE INVENTION

In addition to strength for supporting, the pillar member requires strength for restricting a bending deformation caused by a side collision or the like.

To restrict the bending deformation, it is necessary to increase a geometrical moment of inertia of the pillar member. However, due to limitations relative to the door, the outer size of the cross section of the pillar member is restricted, and the wall thickness of the entire pillar member is increased to gain the geometrical moment of inertia, thus increasing the weight thereof overall, even if an aluminum alloy is used for weight reduction.

It has been conceived that only an outer wall on an outside in a vehicle transverse direction, where a collision load to the pillar member is directly inputted in the event of side collision, be made thicker. However, in the case this is adopted to the pillar member with an open cross section, front and rear walls, respectively extended from front and rear ends of the outer wall of the pillar member, are more likely to deform, tilting in such a direction that the front and rear walls are opened, at an input of the collision load. The flexural rigidity thereof is thus lowered, and an amount of deformation is increased. Therefore, the wall thickness of the front and rear walls cannot be decreased, resulting in an increase in weight.

When the pillar member is cast from an aluminum alloy, molten metal is flowed from one of the front and rear walls through the outer wall to the other in a mold. In such a case, in terms of a casting ability, it is necessary to avoid such a shape of the pillar member that the wall thickness thereof sharply varies in a flow direction of the molten metal.

An object of the present invention is to provide a lightweight pillar structure for a vehicle with high flexural rigidity, without increasing thickness of the entire wall of the pillar member with an open cross section.

An aspect of the present invention is a pillar structure comprising: a pillar member connected to an upper potion and a lower portion of a transversely outer vehicle body, the pillar member being formed into a channel open toward a compartment, with a transversely outer base wall, and a pair of side walls thinner than the base wall, extending from both front and rear sides of the base wall, wherein each of the side walls is formed to have a first tapered portion gradually reducing in thickness from a base end portion of the side wall to a substantially center portion of the width thereof, and stiffening projections formed on an inner surface of the side wall at predetermined intervals in a pillar longitudinal direction, extending from a distal end portion of the side wall to the base end portion thereof.

BRIEF DESCRIPTION OF THE DRAWINGS

The invention will now be described with reference to the accompanying drawings wherein.

DETAILED DESCRIPTION OF THE PREFERRED EMBODIMENTS

Figure 1:
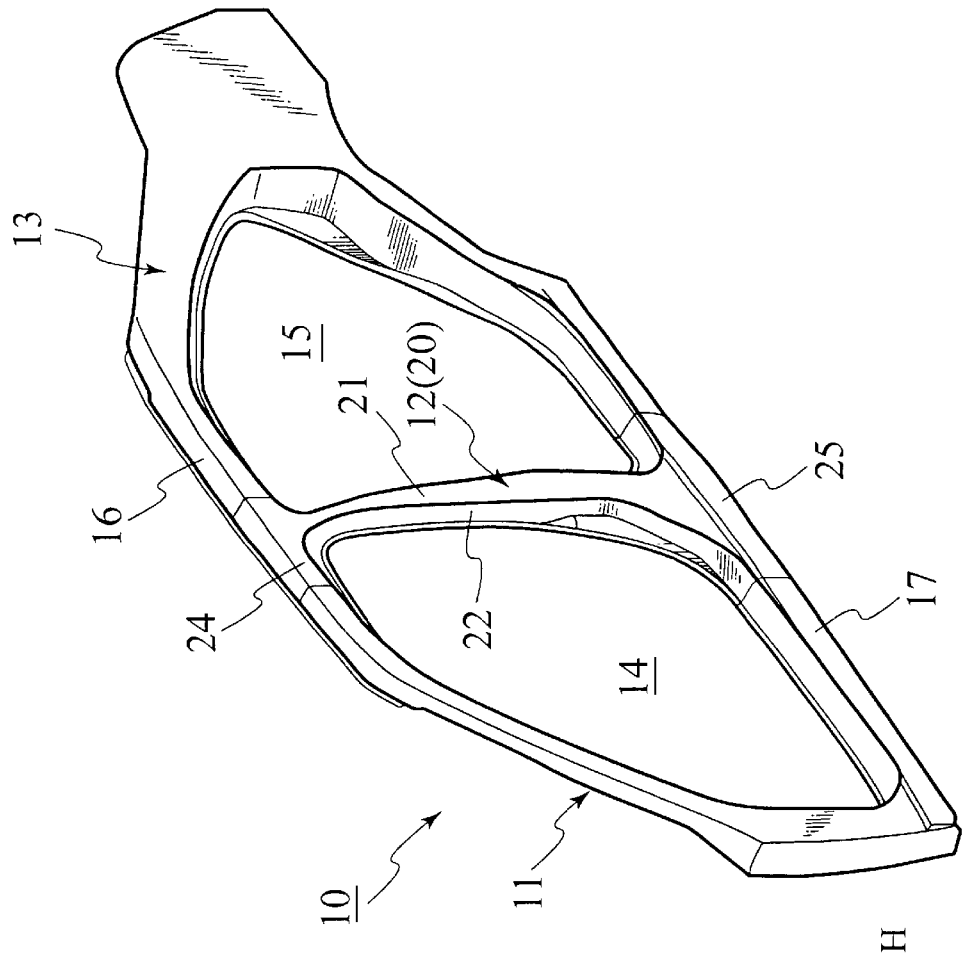
FIG. 1 is a perspective view of a structure of a transversely outer vehicle body according to a pillar structure of a first embodiment of the present invention.

Embodiments of the present invention will be explained below with reference to the drawings, wherein like members are designated by like reference characters.

FIGS. 1 to 11 show a first embodiment of the present invention. As shown in FIG. 1, in a side structure 10 (transversely outer vehicle body) of a vehicle, openings 14 and 15 for attachment of a front door and a rear door (not shown) are provided between a front pillar 11 and a center pillar 12 and between the center pillar 12 and a rear pillar 13, respectively.

Figure 2:
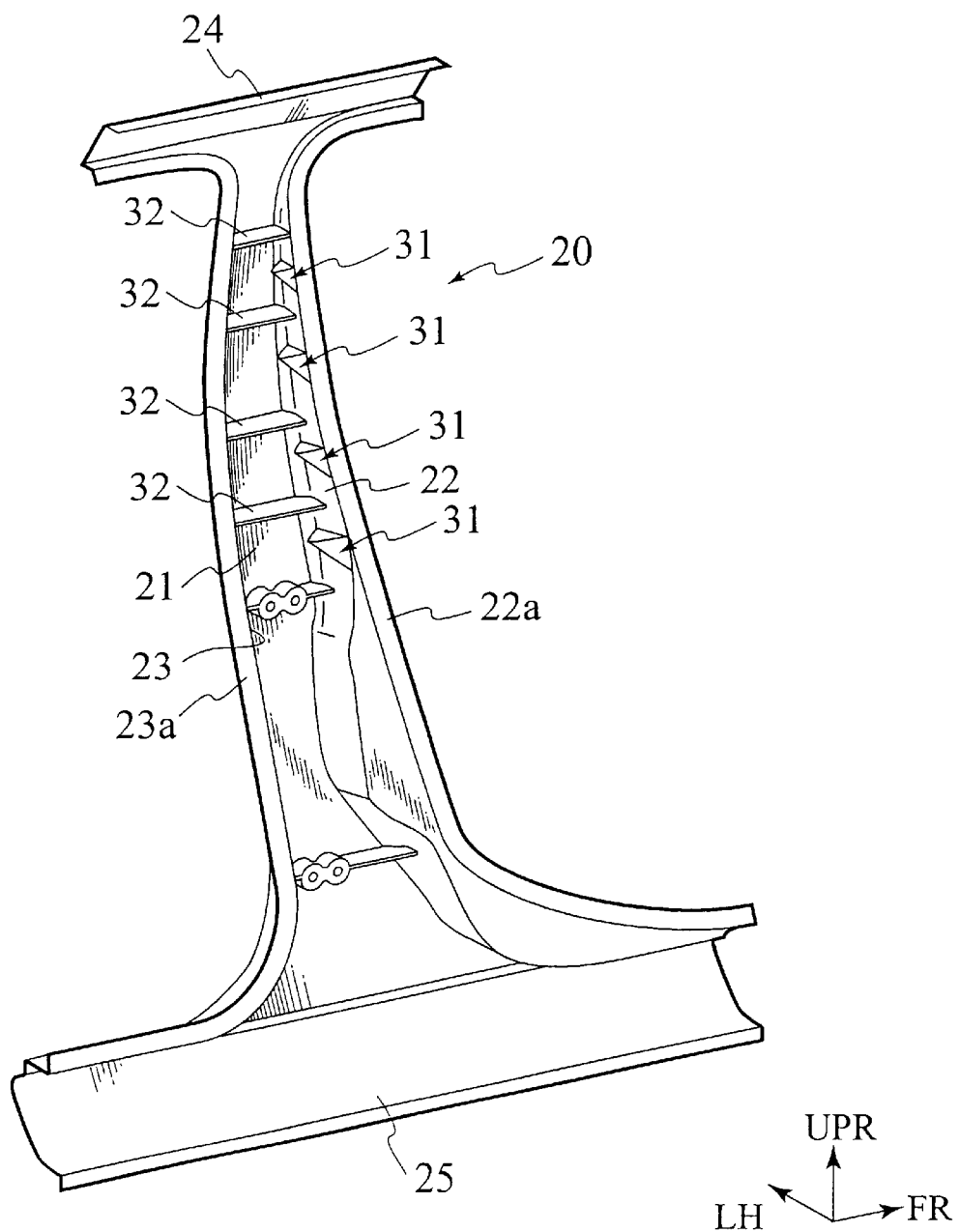
FIG. 2 is a perspective view of a pillar member according to the pillar structure of the first embodiment of the present invention, viewed from an inside of a compartment.

The center pillar 12 is arranged substantially in a center portion of the side structure 10 in a vehicle longitudinal direction and vertically connected across a roof side member 16 in an upper portion of a vehicle body and a side sill 17 in a lower portion of the vehicle body. As shown in FIG. 2, the center pillar 12 includes a pillar member 20 of a structure formed into a channel with a cross section open toward an inside of a compartment.

As shown in FIGS. 3 to 6, the pillar member 20 includes an outer wall 21 (base wall) arranged outward in a vehicle transverse direction, and front and rear walls (side walls) 22 and 23 extended toward the inside of the compartment from both front and rear sides of the outer wall 21. The pillar member 20 is thus formed to have a channel-shaped cross section open toward the inside of the compartment. On distal ends of the front and rear walls 22 and 23 on a side of the inside of the compartment, flange portions 22a and 23a are formed to be bent outward at a predetermined angle and extended in the vehicle longitudinal direction, thus constituting a substantially hat-shaped cross section of the pillar member 20.

As shown in FIG. 2, in the upper end portion of the pillar member 20, an upper bracket portion 24 is formed along an outer shape of the roof side rail 16 (see FIG. 1) on an outside of the vehicle. In the lower end portion thereof, a lower bracket portion 25 is formed along an outer shape of the side sill 17. The pillar member 20 is vertically arranged to be connected to the roof side rail 16 and the side sill 17 so as to stride over the vehicle body by lap welding the upper bracket portion 24 to the outside of the roof side rail 16 and the lower bracket portion 25 to the outside of the side sill 17.

The pillar member 20 of a structure with an open cross section as described above is integrally formed by casting from a lightweight metal material such as an aluminum alloy.

Figure 4:
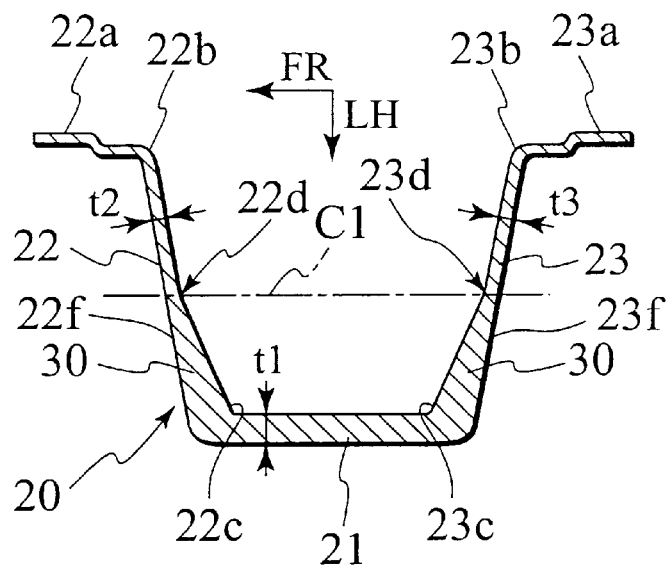
FIG. 4 is an enlarged sectional view of the pillar member of FIG. 3 taken along a line IV—IV.

A wall thickness t1 of the outer wall 21 is formed thicker than wall thicknesses t2 and t3 of the front and rear walls 22 and 23 (t1>t2, t3) as shown in FIG. 4. Inside the front and rear walls 22 and 23, outer tapered portions 30 and 30 are formed to extend in a pillar longitudinal direction, gradually increasing in thickness toward the outside of the compartment (downward in FIG. 4), from a substantially center portion C1 of the width of the front and rear walls 22 and 23 to a base end portion thereof, while keeping outer surfaces 22f and 23f of the front and rear walls 22 and 23 as flat surfaces. In such a manner, the geometrical moment of inertia of the pillar member 20 can be increased.

In the outer tapered portions 30, inner surfaces of the front and rear walls 22 and 23 are greatly inclined in such a direction that the opposing inner surfaces thereof gradually approach each other toward the outside of the compartment from the substantially center portion C1 of the width thereof. The entire inner surfaces of the front and rear walls 22 and 23 are bent surfaces 22d and 23d with the substantially center portion C1 of the vehicle transverse direction width as a valley.

Figure 3:
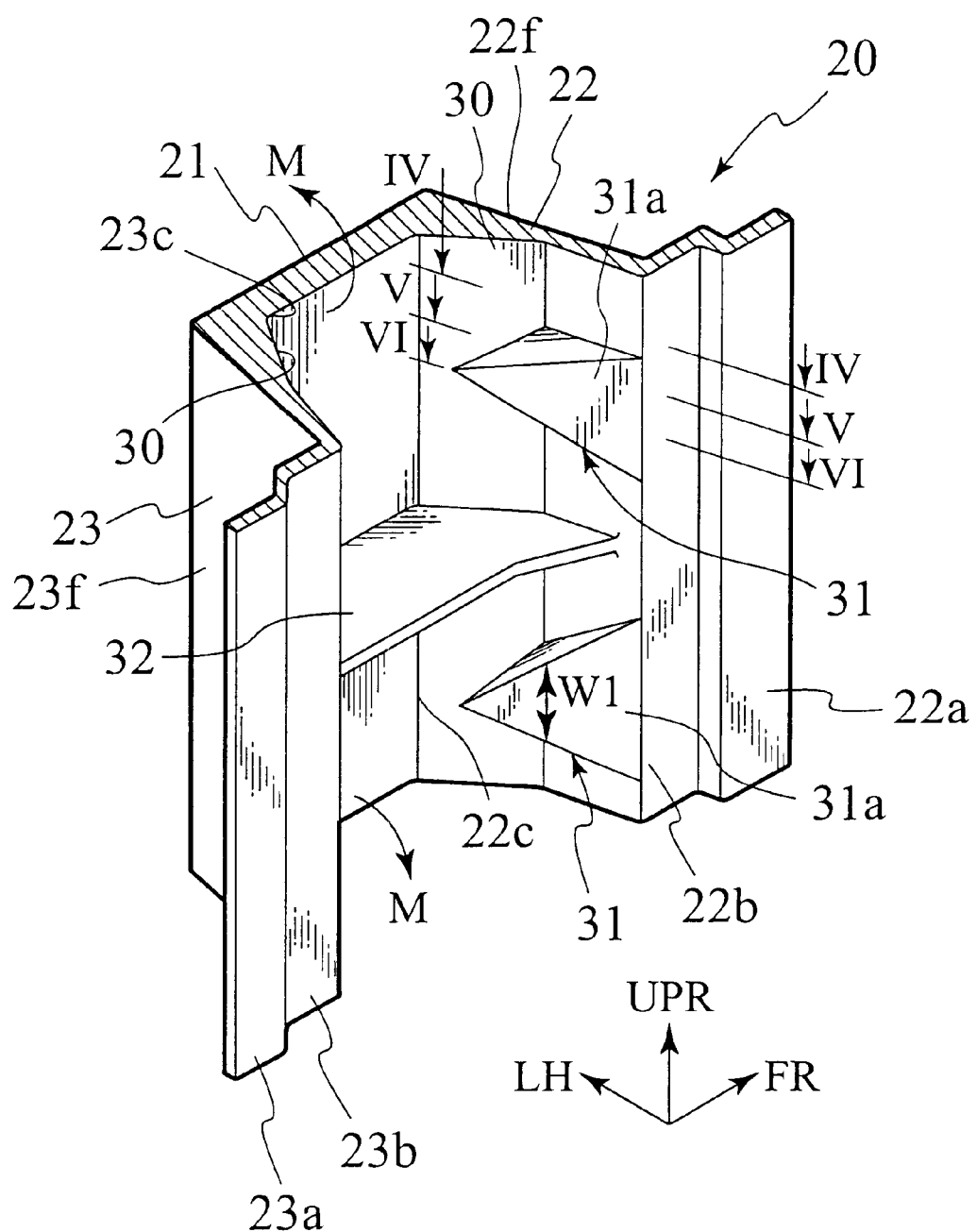
FIG. 3 is an enlarged perspective view of a main portion of the pillar member of FIG. 2, viewed from the inside of the compartment.
Figure 5:
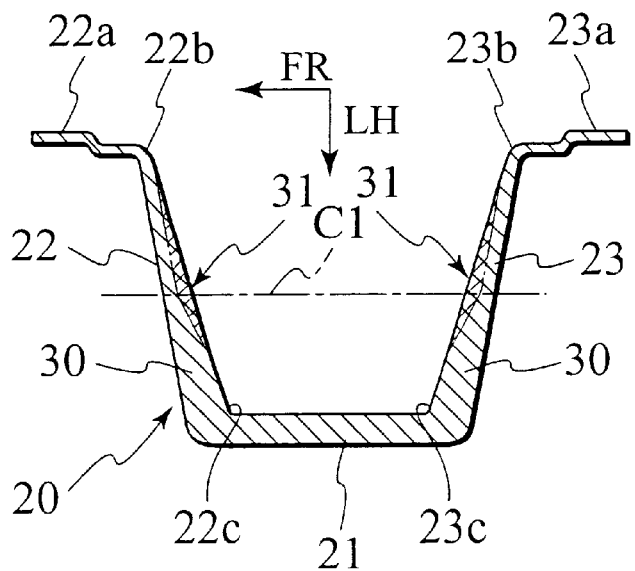
FIG. 5 is an enlarged sectional view of the pillar member of FIG. 3 taken along a line V—V.
Figure 6:
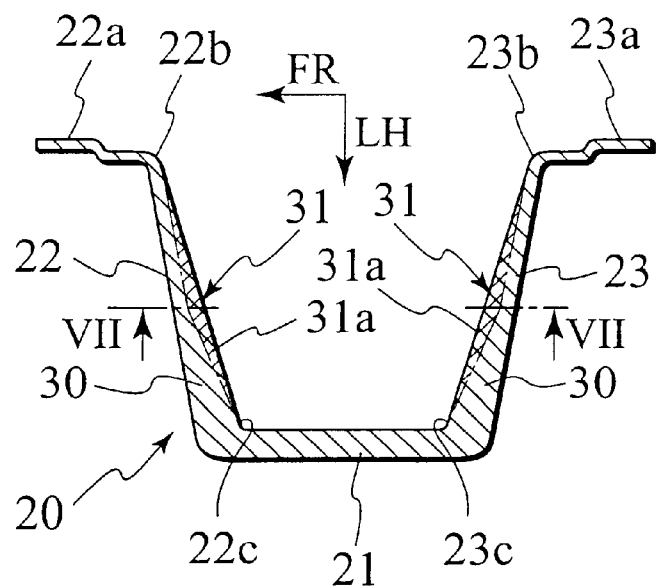
FIG. 6 is an enlarged sectional view of the pillar member of FIG. 3 taken along a line VI—VI.

On the bent surfaces 22d and 23d of the front and rear walls 22 and 23, where the outer tapered portions 30 are formed, as shown in FIGS. 3, 5, and 6, stiffening projections 31 and 31 projecting inward are formed at proper intervals in the pillar longitudinal direction (or the vertical direction) extending from edges 22b and 23b (distal end portions) on an in-compartment side to edges 22c and 23c (base end portions) on an out-of-compartment side.

As shown in shaded portions of FIGS. 5 and 6, the stiffening projections 31 are formed so as to fill the valley portions of the bent surfaces 22d and 23d formed inside the front and rear walls 22 and 23. Projective end surfaces 31a (top faces) of the stiffening projections 31 are formed to be flat surfaces from the in-compartment side edges 22b and 23b to the out-of-compartment side edges 22c and 23c, where a shape of each projective end surface 31a on a cross section orthogonal to the pillar longitudinal direction is a straight line. In other words, the projective end surfaces 31a are formed as flat surfaces on a plane containing the in-compartment side edges 22b and 23b and the out-of-compartment side edges 22c and 23c.

Width W1 (see in FIG. 3) of each projective end surface 31a in the pillar longitudinal direction on a side of the in-compartment side edges 22b and 23b is formed larger than that on a side of the out-of-compartment side edges 22c and 23c, and each projective end surface 31a is thus shaped substantially in a triangle.

Figure 7:
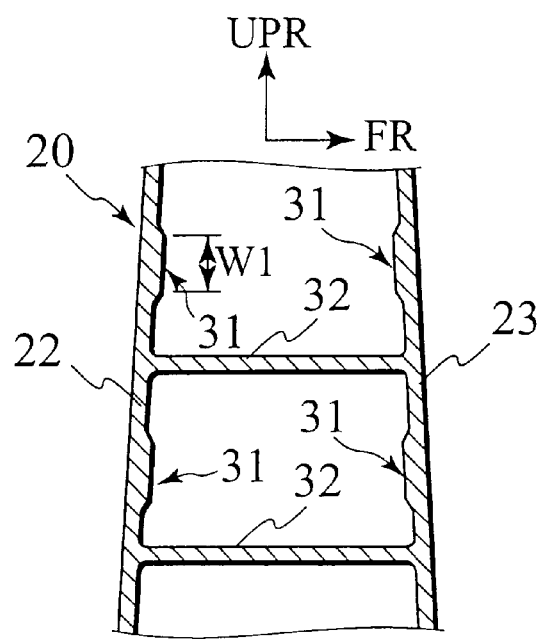
FIG. 7 is a sectional view of the pillar member of FIG. 6 taken along a line VII—VII.

As shown in FIGS. 2, 3, and 7, the pillar member 20 is provided with transverse ribs 32, 32, between the respective stiffening projections 31 in the inside of the pillar member 20, which is surrounded by the inner surfaces of the outer wall 21 and the front and rear walls 22 and 23.

Figure 8:
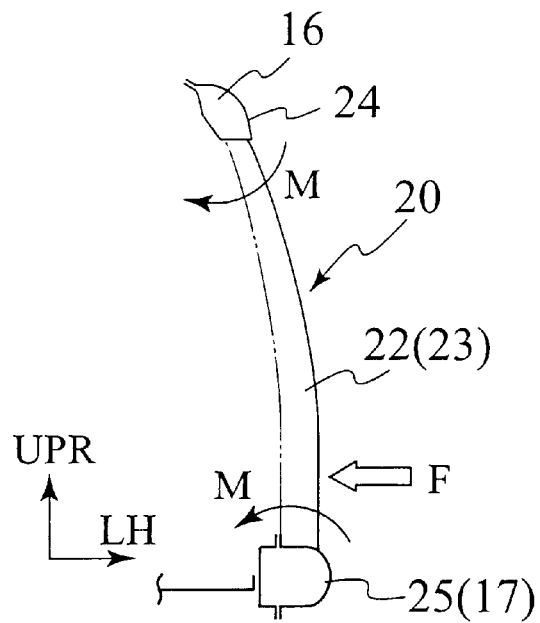
FIG. 8 shows a front view of the pillar member according to the pillar structure of the first embodiment of the present invention and input of a load in side collision.
Figure 9:
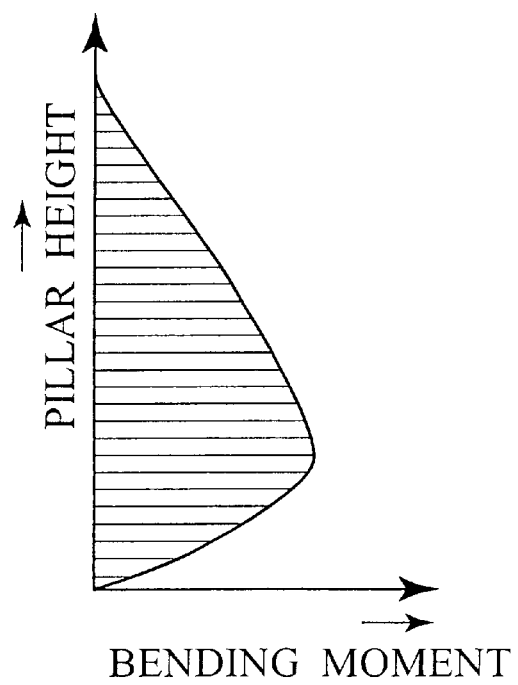
FIG. 9 is a diagram showing bending moment distribution when the side load of FIG. 8 is inputted to the pillar member.

With the above described constitution, in the center pillar structure of this embodiment, when a collision load F is inputted to the outer wall 21 of the pillar member 20 by side collision as shown in FIG. 8, a bending moment distribution as shown in FIG. 9 is generated in the pillar member 20. Accordingly, as shown in FIGS. 3 and 8, a moment M, which would bend the pillar member 20 so that the middle portion thereof is displaced toward the inside of the compartment (leftward in the same drawings), acts on the pillar member 20.

Figure 10:
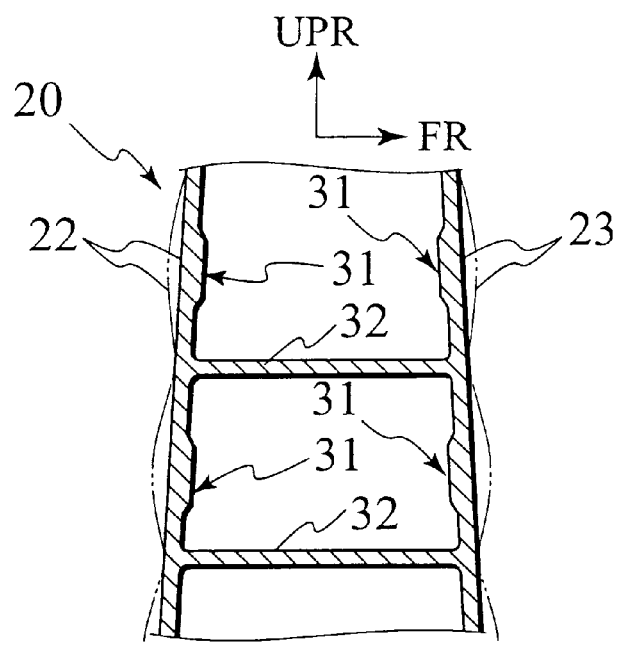
FIG. 10 is a sectional view showing a deformation of the pillar member in the input of the load of FIG. 8, corresponding to FIG. 7.
Figure 11:
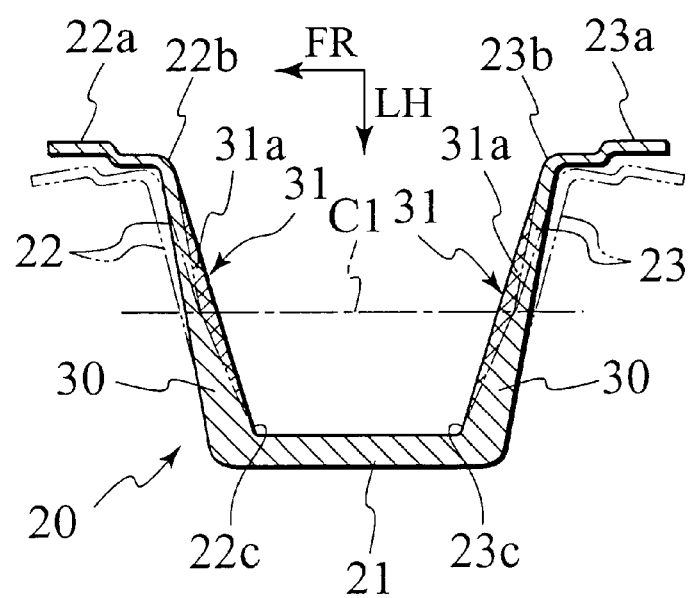
FIG. 11 is an enlarged sectional view showing a deformation of the pillar member in the input of the load of FIG. 8, corresponding to FIG. 6.

In the pillar member 20 with a cross section open toward the inside of the compartment, the front and rear walls 22 and 23 between the respective ribs 32, as shown in FIG. 10, are intended to be deformed in a direction separating from each other as shown by two dot chain lines in FIGS. 10 and 11. However, since the outer wall 21 of the pillar member 20 is formed to be thick, and the outer tapered portions 30, the stiffening projections 31, and the transverse ribs 32 are formed inside the front and rear walls 22 and 23, deformation is effectively restricted, avoiding great weight increase of the pillar member 20. Against the bending deformation and deformation in a twisting direction of the pillar member 20, the transverse ribs 32 restrict the local out-of-plane deformation of the front and rear walls 22 and 23. Accordingly, flexural rigidity and torsional rigidity of the pillar member 20 are further increased.

Specifically, since the outer wall 21 of the pillar member 20 is formed to be thicker than the front and rear walls 22 and 23 (t1>t2, t3), the flexural rigidity of the pillar member 20 can be increased without increasing the wall thickness of the entire pillar member 20. With the outer tapered portions 30 formed on the front and rear walls 22 and 23, the rigidity of the entire front and rear walls 22 and 23 can be increased.

Since the stiffening projections 31 are formed on the front and rear walls 22 and 23, where the outer tapered portions 30 are formed, the flexural rigidity of the front and rear walls 22 and 23 can be increased.

Since the stiffening projections 31 are not formed uniformly in the entire pillar member 20, but are partially formed at proper intervals in the pillar longitudinal direction, the increase in weight of the entire pillar member 20 can be restricted while securing the rigidity of the front and rear walls 22 and 23.

Therefore, in the pillar member 20, it is possible to prevent an increase in the weight of the entire pillar member 20 while restricting local deformation and bending deformation. Moreover, the thickness of the outer tapered portions 30 is gradually increased from the substantially center portion C1 of the front and rear walls 22 and 23 toward the outside of the compartment. In the casting process of the pillar member 20, when the molten aluminum alloy is flowed from one of the flange portions 22a and 23a though the outer wall 21 into the other in the mold, since there is no portion where the thickness changes sharply in the pillar member 20, the molten metal can flow smoothly. Therefore, good casting can be performed.

With regard to the flow of the molten metal, a portion where the thickness sharply changes in the flow direction of the molten metal can also be eliminated by the provision of the stiffening projections 31, thus obtaining good casting ability.

Furthermore, since the width W1 of the projective end surfaces 31a of the stiffening projections 31 in the pillar longitudinal direction on the in-compartment side edges 22b and 23b is formed greater than that on the out-of-compartment side edges 22c and 23c, the molten metal flows more smoothly, whereby the casting ability can be further improved, and influence of variation in material properties to the products can be minimized.

Since the projective end surfaces 31a increases in width toward the inside of the compartment, the load F inputted from the outside of the compartment can be dispersed in the wider portions. Therefore, the local deformation of the front and rear walls 22 and 23 can be effectively restricted.

Figure 12:
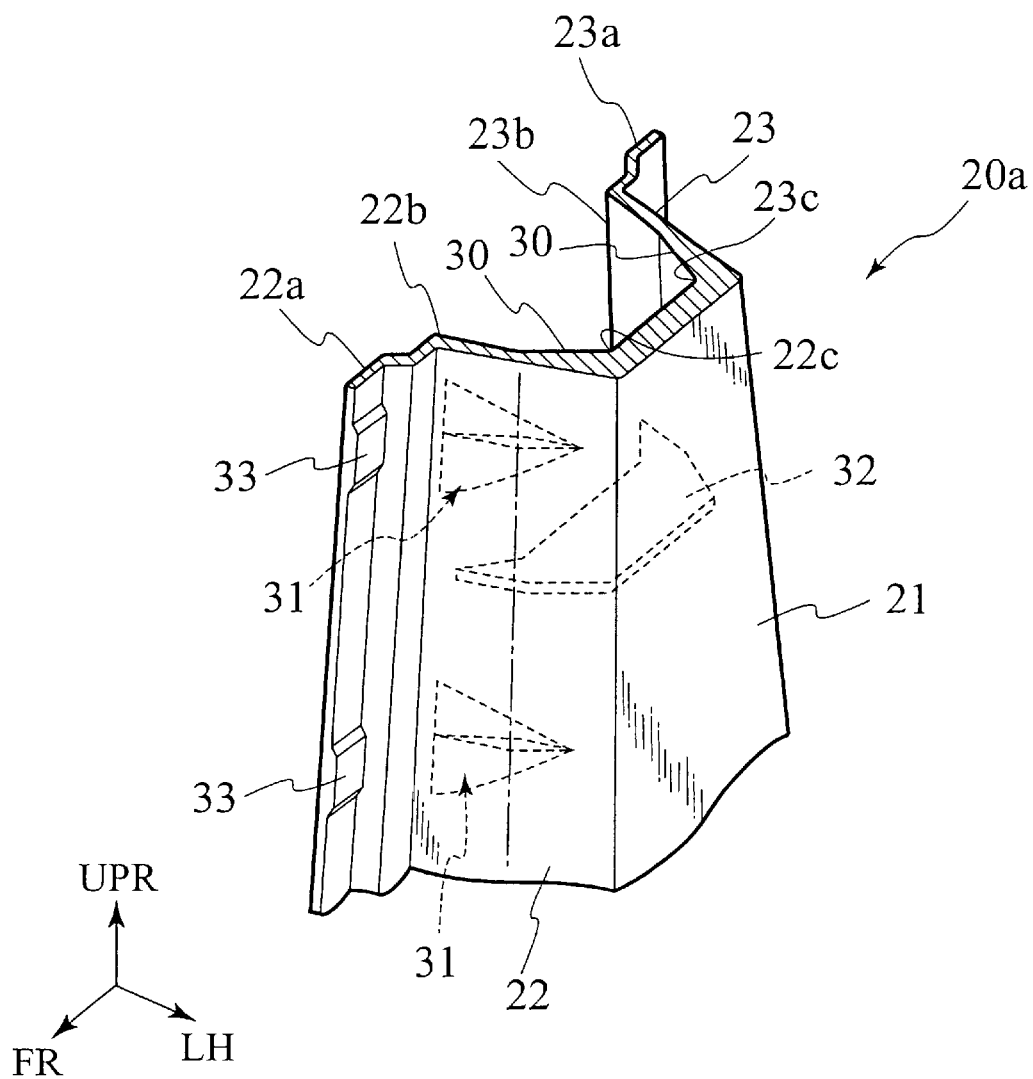
FIG. 12 is a perspective view of a main portion of a pillar member according to a pillar structure of a second embodiment of the present invention, viewed from the outside of the compartment.

Next, description will be made for a second embodiment. FIG. 12 shows the second embodiment of the present invention, and components similar to those in the first embodiment are denoted by the same reference numerals and symbols. The common explanation will be omitted.

FIG. 12 is a perspective view of a main portion of a pillar member 20a, viewed from the outside of the compartment. The main difference between the pillar member 20a of the second embodiment and the pillar member 20 of the first embodiment is that thick portions 33 are formed on transversely outer surfaces of the flange portions 22a and 23a of the pillar member 20a.

The thick portions 33 are provided in pillar longitudinal positions corresponding to the stiffening projections 31 of the front and rear walls 22 and 23 and extended in the vehicle longitudinal direction.

Accordingly, in the pillar member 20a of the second embodiment, high rigidity portions can be formed continuously from the thick portions 33 formed on the flange portions 22a and 23a to the stiffening projections 31. Accordingly, the rigidity against the tilt deformation of the front and rear walls 22 and 23 can be increased, and the flexural rigidity of the pillar member 20a can thus be increased. Moreover, such portions increasing in thickness allow the molten metal to flow more smoothly and casting ability to be improved. Therefore, influence of variation in material properties to the products can be minimized.

Next, description will be made for a third embodiment. FIGS. 13 to 17 show the third embodiment of the present invention, and components similar to those in the first embodiment are denoted by the same reference numerals and symbols. The common explanation will be omitted.

The main difference between the pillar member 20b of the third embodiment and the pillar member 20 of the first embodiment is that the rigidity increased by further increasing the thickness of each stiffening projection 31.

Figure 13:
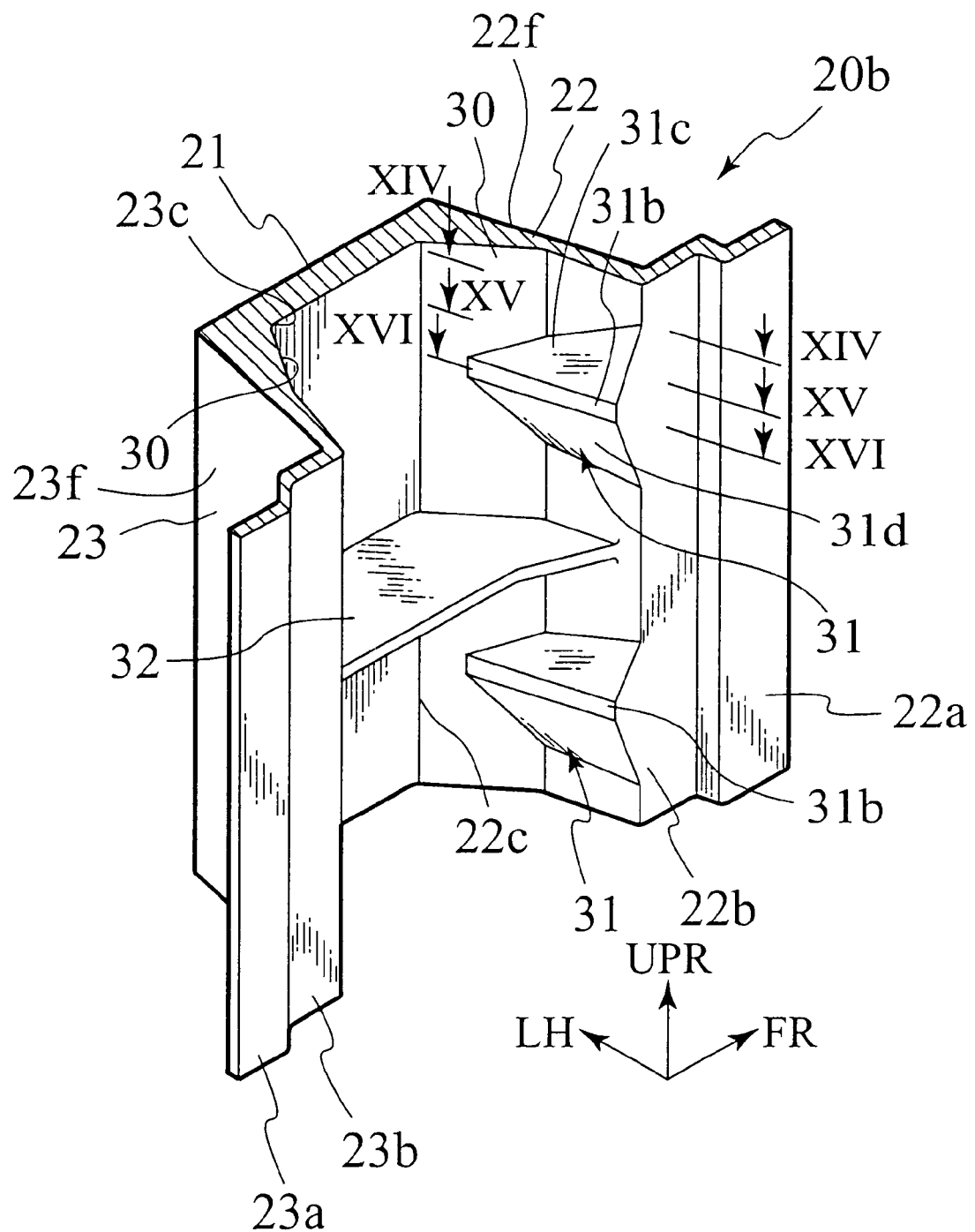
FIG. 13 is an enlarged perspective view of a main portion of a pillar member according to a pillar structure of a third embodiment of the present invention, viewed from the inside of the compartment.
Figure 14:
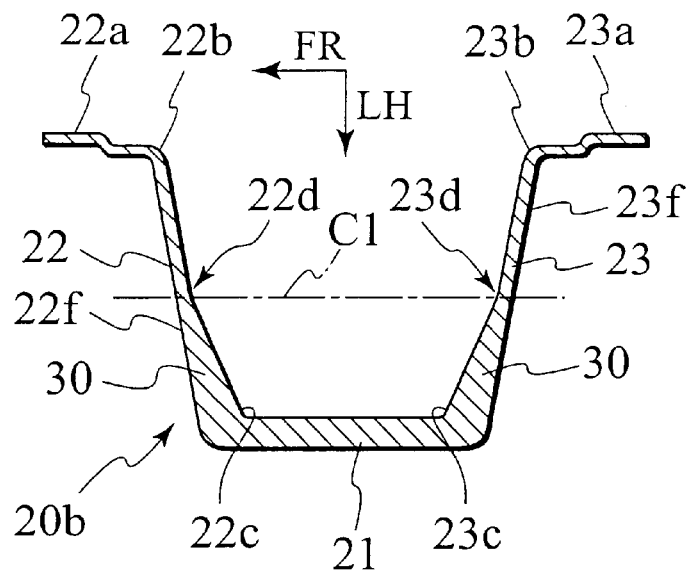
FIG. 14 is an enlarged sectional view of the pillar member of FIG. 13 taken along a line XIV—XIV.
Figure 15:
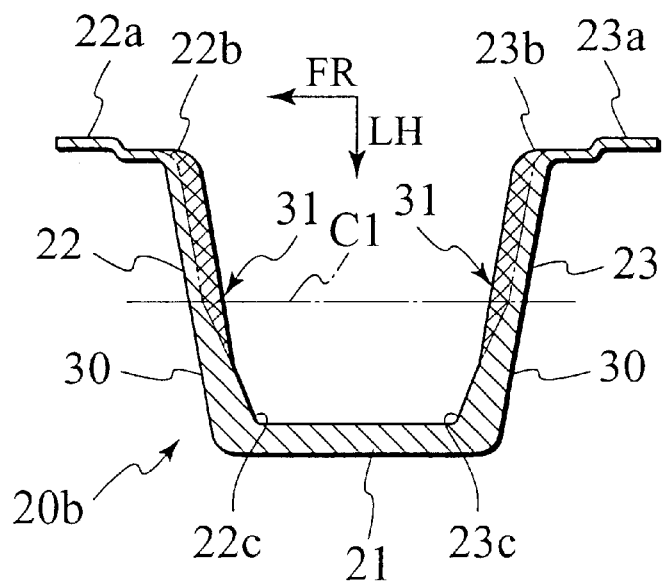
FIG. 15 is an enlarged sectional view of the pillar member of FIG. 13 taken along a line XV—XV.
Figure 16:
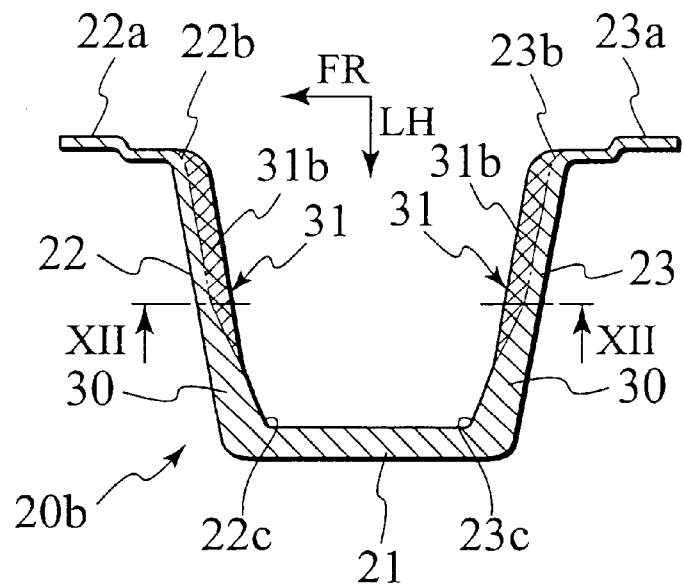
FIG. 16 is an enlarged sectional view of the pillar member of FIG. 13 taken along a line XVI—XVI.
Figure 17:
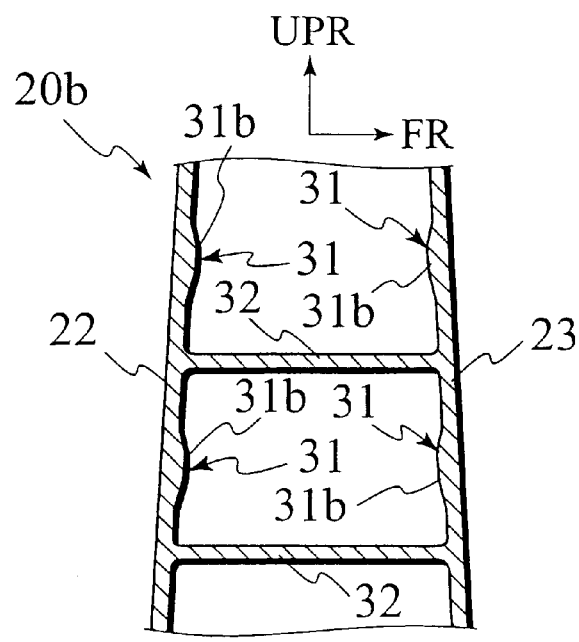
FIG. 17 is a sectional view of the pillar member of FIG. 16 taken along a line XVII—XVII.

As shown in FIGS. 13 to 17, the stiffening projections 31 are formed on the inside of the front and rear walls 22 and 23, where the outer tapered portions 30 and 30 are formed, at proper intervals in the pillar longitudinal direction from the in-compartment side edges 22b and 23b to the out-of-compartment side edges 22c and 23c, similarly to the first embodiment. Particularly, in the third embodiment, as shown in FIGS. 13 and 17, each stiffening projection 31 has its inner surface formed with two planes, which are an inclined plane 31c on the upper side in the pillar longitudinal direction and an inclined plane 31d on the lower side. The edge portion at a ridge lines 31b as an intersection of the two planes, extending toward the inside of the compartment, is further projected inward in the cross section. The ridge lines 31b are substantially parallel to the outer surfaces 22f and 23f of the front and rear walls 22 and 23.

Therefore, in the pillar member 20b of the third embodiment, similar functions to those of the first embodiment can be exerted as a matter of course. Furthermore, as shown in shaded portions of FIGS. 15 and 16, the thickness of each stiffening projection 31 is further increased at the edge portion at the ridge line 31b. Accordingly, the rigidity of the front and rear walls 22 and 23 reinforced with the stiffening projections 31 can be further increased.

Even in the case where the rigidity is increased in such a manner, the portion increasing in thickness of each stiffening projection 31 is only the tip portion thereof which has a triangular cross section orthogonal to the ridge line 31b, in other words, a tetrahedral portion surrounded by the projective end surface 31a of the first embodiment and the inclined planes 31c and 31d of this embodiment. Therefore, the rigidity can be effectively increased without a significant increase in weight.

Next, description will be made for a fourth embodiment. FIGS. 18 to 22 show the fourth embodiment of the present invention, and components similar to those in the first embodiment are denoted by the same reference numerals and symbols. The common explanation will be omitted.

The main difference between a pillar member 20c of the fourth embodiment and the pillar member 20 of the first embodiment is the shape of the cross sections of the front and rear walls 22 and 23.

Specifically, as shown in FIGS. 18 to 22, the pillar member 20c of the fourth embodiment includes inner tapered portions 34 formed to extend in the pillar longitudinal direction in the inside of the front and rear walls 22 and 23, where the outer tapered portions 30 are formed. The inner tapered portions 34 gradually increase in thickness toward the inside of the compartment (upward in FIG. 19)

from the central beginning ends of the respective outer tapered portions 30, that is, from the substantially center portion C1 of the width of the front and rear walls 22 and 23 to the distal end thereof, while keeping the outer surfaces 22f and 23f of the front and rear walls 22 and 23 as flat surfaces.

Figure 19:
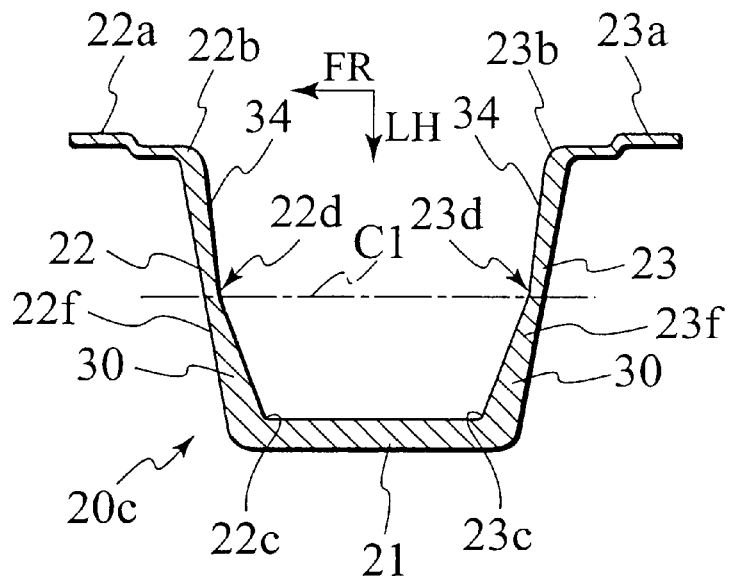
FIG. 19 is an enlarged sectional view of the pillar member of FIG. 18 taken along a line XIX—XIX.
Figure 20:
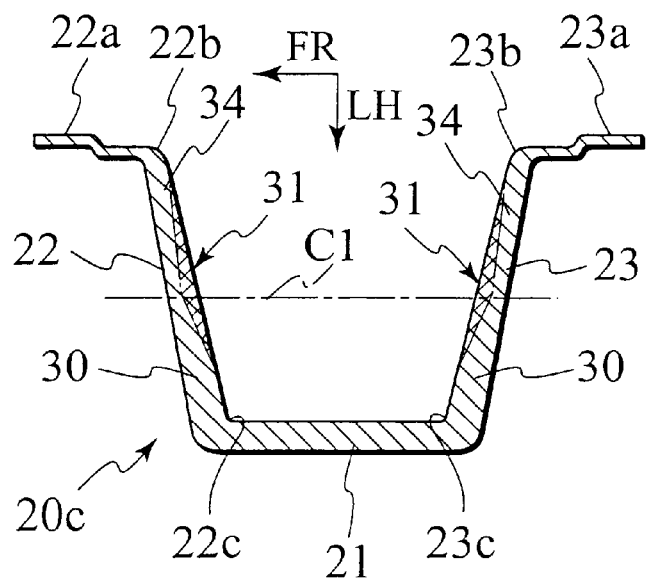
FIG. 20 is an enlarged sectional view of the pillar member of FIG. 18 taken along a line XX—XX.
Figure 21:
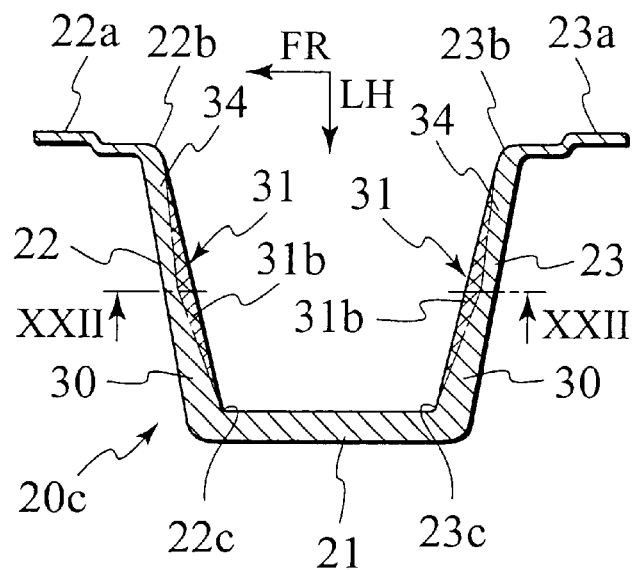
FIG. 21 is an enlarged sectional view of the pillar member of FIG. 18 taken along a line XXI—XXI.
Figure 22:
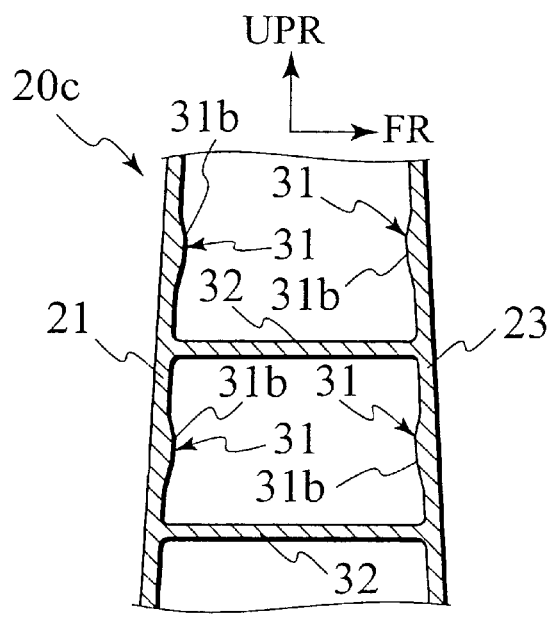
FIG. 22 is a sectional view of the pillar member of FIG. 21 taken along a line XXII—XXII.

Accordingly, in the pillar member 20c of the fourth embodiment, similar functions to those of the first embodiment can be exerted as a matter of course. Furthermore, as shown in FIG. 19, since the thickness of the walls is increased by forming the inner tapered portions 34 inside the front and rear walls 22 and 23, the geometrical moment of inertia can be further increased, and the flexural rigidity of the front and rear walls 22 and 23 can be further increased. Moreover, the molten metal can be flowed more smoothly, thus improving the casting ability.

Figure 18:
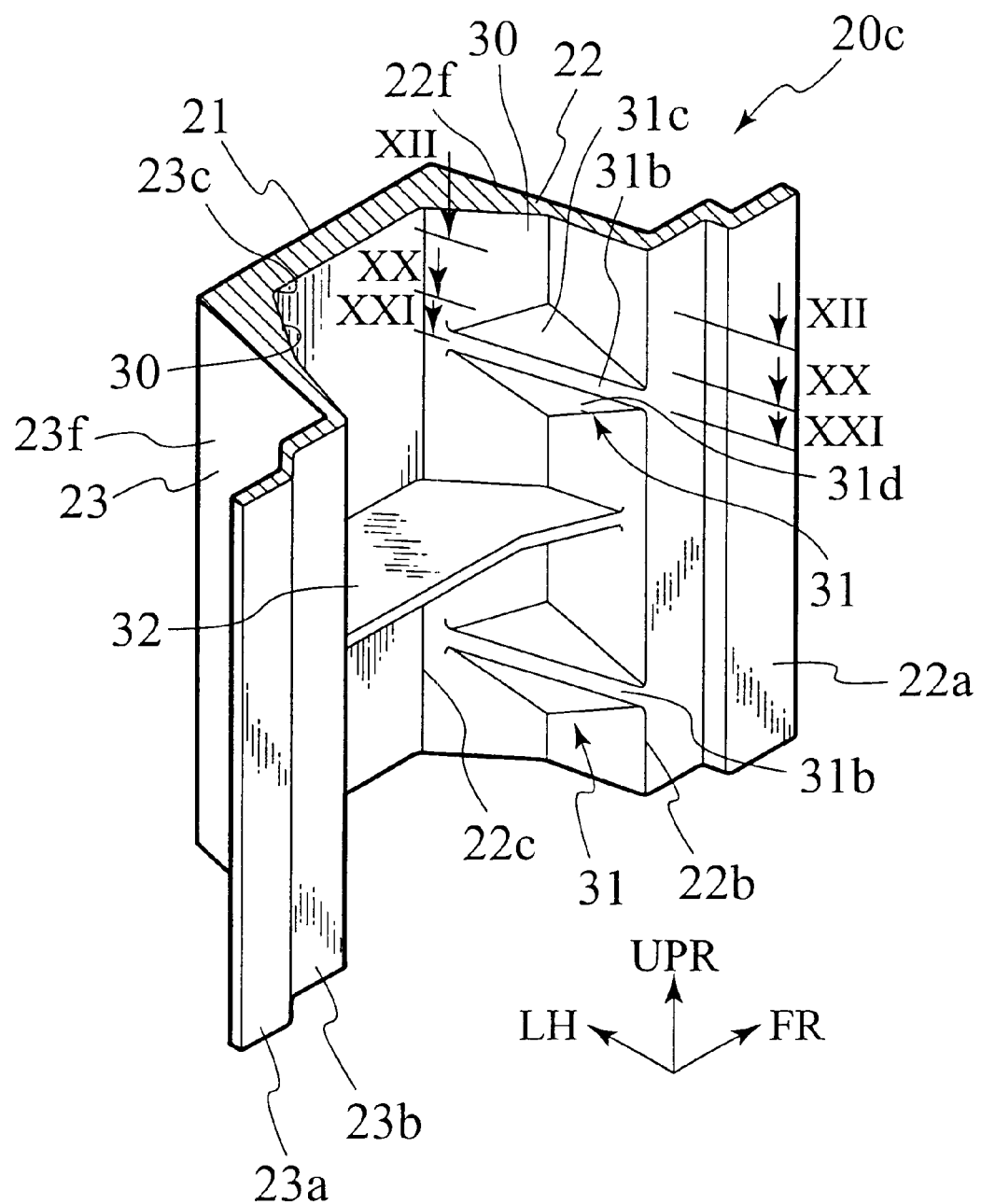
FIG. 18 is an enlarged perspective view of a main portion of a pillar member according to a pillar structure of a fourth embodiment of the present invention, viewed from the inside of the compartment.

In the pillar member 20c of the fourth embodiment, the thickness of the outer tapered portions 30 and the inner tapered portions 34 is increased substantially symmetrically with respect to the substantially center portion C1 of the width. Accordingly, as shown in shaded portions of FIG. 21, in the case where each stiffening projection 31 is formed by two planes, which are the inclined plane 31c on the upper side in the pillar longitudinal direction and the inclined plane 31d on the lower side, from the in-compartment side edges 22b and 23b of the bent surfaces 22d and 23d to the out-of-compartment side edges 22c and 23c thereof, the foot of each stiffening projection 31 is rhombus-shaped as shown in FIG. 18 when viewed from the inside in the cross section of the pillar member 20c. Moreover, the projective edges of the stiffening projections 31 are the ridge lines 31b extending from the in-compartment side edges 22b and 23b of the bent surfaces 22d and 23d to the out-of-compartment side edges 22c and 23c. Specifically, the stiffening projections 31 are formed so as to decrease in width in the pillar longitudinal direction from the substantially center portion C1 of the width of the front and rear walls 22 and 23 toward the inside and the outside of the compartment.

Accordingly, when casting, the molten metal can flow more smoothly in the stiffening projection 31, improving the casting ability, and influence of the individual differences in material properties can be reduced.

In the first to the fourth embodiments, disclosed are the cases where the outer tapered potions 30 and additionally the inner tapered portions 34 are formed on both the front and rear walls 22 and 23. However, even in the case where the outer tapered portions 30 and/or the inner tapered portions 34 are formed on any one of the front wall 22 and the rear wall 23, the geometrical moment of inertia is increased, and thus the flexural rigidity of the pillar members 20, 20a, 20b, and 20c can be increased.

The pillar members 20, 20a, 20b, and 20c of the center pillar 12 in the first to the fourth embodiments have been described as examples of the pillar member of the present invention. However, the present invention is not limited to these embodiments and various embodiments can be employed without departing from the scope of the invention. For example, the present invention can be applied to the front pillar 11 and the rear pillar 13 as well as the center pillar 12. The scope of the invention being indicated by the claims, and all variations which come within the meaning of claims are intended to be embraced herein.

The present disclosure relates to subject matter contained in Japanese Patent Application No. 2002-007758, filed on Jan. 16, 2002, the disclosure of which is expressly incorporated herein by reference in its entirety.

What is claimed is:

1. A pillar structure comprising:
a pillar member connected to an upper potion and a lower portion of a transversely outer vehicle body, the pillar member being formed into a channel open toward a compartment, with a transversely outer base wall, and a pair of side walls thinner than the base wall, extending from both front and rear sides of the base wall,
wherein each of the side walls is formed to have a first tapered portion gradually reducing in thickness from a base end portion of the side wall to a substantially center portion of the width thereof, and stiffening projections formed on an inner surface of the side wall at predetermined intervals in a pillar longitudinal direction, extending from a distal end portion of the side wall to the base end portion thereof.

2. The pillar structure according to claim 1,
wherein each of the stiffening projections has its top face formed such that a width thereof in the pillar longitudinal direction on a base end side is larger than that on a distal end side.

3. The pillar structure according to claim 1,
wherein the pillar member includes flanges extending in a vehicle longitudinal direction from distal ends of the side walls, each of the flanges has longitudinally extending thick portions at pillar longitudinal positions corresponding to the stiffening projections.

4. The pillar structure according to claim 1,
wherein each of the side walls has a second tapered portion gradually increasing in thickness from the substantially center portion of the width of the side wall to the distal end portion thereof.

5. The pillar structure according to claim 4,
wherein the stiffening projection is formed to decrease in width in the pillar longitudinal direction from the substantially center portion of the width of the side wall to the base and distal end portions thereof.

6. The pillar structure according to claim 1,
wherein each of the stiffening projections has its inner surface formed with two planes, and a ridge line as an intersection of the two planes extends toward the compartment substantially parallel to outer surface of the side wall.

7. The pillar structure according to claim 1,
wherein the pillar member has ribs inside the base wall and the side walls, arranged between the respective stiffening projections.

* * * * *